April 7, 1925.
W. F. MARTIN
DISPLAY PLATE FOR AUTOMOBILE BUMPERS
Filed March 20, 1924
1,533,068
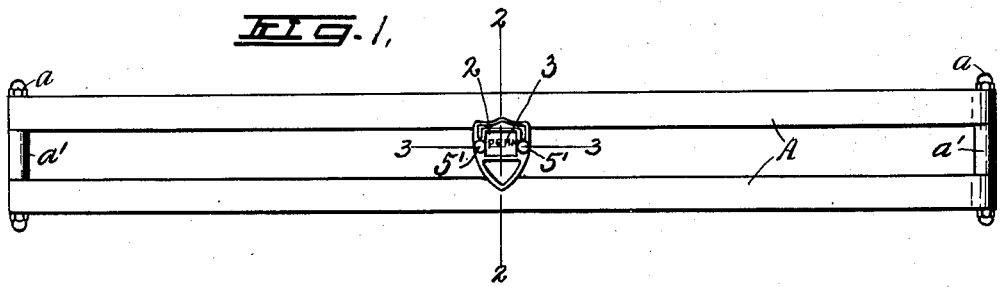
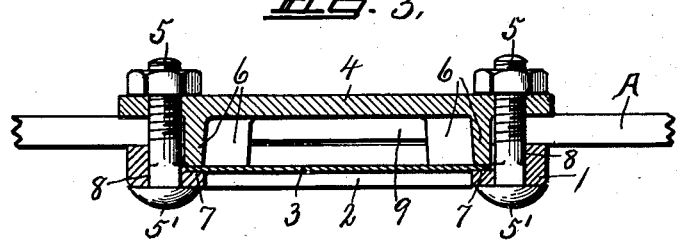
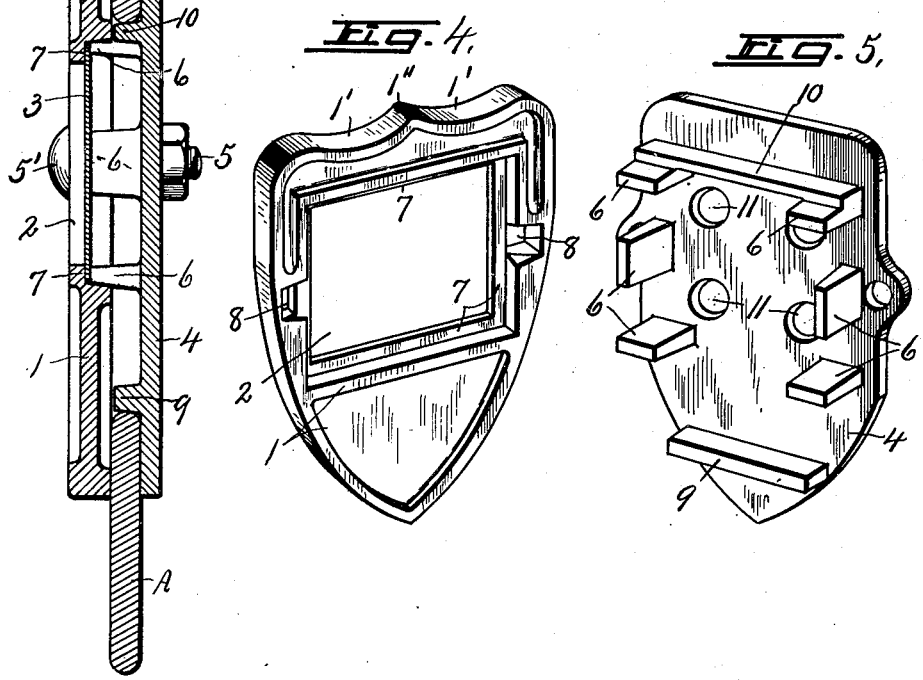
INVENTOR
Wm. F. Martin
BY Denison & Thompson
ATTORNEYS
WITNESS
H. N. Tursk.

Patented Apr. 7, 1925.

1,533,068

UNITED STATES PATENT OFFICE.

WILLIAM F. MARTIN, OF BALDWINSVILLE, NEW YORK, ASSIGNOR TO PENN SPRING WORKS INC., OF BALDWINSVILLE, NEW YORK, A CORPORATION OF NEW YORK.

DISPLAY PLATE FOR AUTOMOBILE BUMPERS.

Application filed March 20, 1924. Serial No. 700,616.

*To all whom it may concern:*

Be it known that I, WILLIAM F. MARTIN, a citizen of the United States of America, and a resident of Baldwinsville, in the county of Onondaga, in the State of New York, have invented new and useful Improvements in Display Plates for Automobile Bumpers, of which the following, taken in connection with the accompanying drawings, is a full, clear, and exact description.

This invention relates to an automobile bumper plate used more particularly in connection with spaced bumper bars to assist in holding them in relatively fixed spaced relation and also serving as a means for receiving and supporting various plaques or display plates bearing distinctive marks or characters for identification and other purposes.

The main object is to provide a device of this character which will be at once ornamental and serviceable for the purposes named and which may be easily and quickly applied to the bumper bar or bars with a minimum liability of relative displacement.

Another object is to construct the device in sections adapted to be applied to opposite faces of the bars and to provide said sections with interlocking members for holding them against relative movement when secured in place.

A further object is to provide one of the sections with a sight opening and to removably secure the display section across the opening by the same means employed for clamping the main sections to the bumper bars.

Other objects and uses relating to specific parts of the device will be brought out in the following description.

In the drawings:—

Figure 1 is a face view of an automobile bumper equipped with my improved spacing and display device.

Figure 2 is an enlarged vertical sectional view taken on line 2—2, Figure 1.

Figure 3 is an enlarged horizontal sectional view taken on line 3—3, Figure 1.

Figures 4 and 5 are perspective views of the outer and inner plate sections respectively.

In order that my invention may be clearly understood, I have shown a bumper composed of spaced parallel bars —A— secured at both ends by bolts —a— and spacing sleeves —a'—.

The device forming the subject matter of my present invention is preferably applied to the central portions of the bars —A— substantially midway between their ends and comprises an outer plate —1— having a sight opening —2—, a removable plaque or display plate —3—, and suitable means for clamping the plate —1— to the outer faces of the bumper bars —A— and for simultaneously holding the display plate —3— in operative position.

As illustrated, this clamping means comprises an inner plate —4— and a pair of clamping bolts —5— which are passed through registering openings in the plates —1— and —4— at opposite ends of the sight opening —2—, the plate —4— being provided with lugs —6— for engaging the inner face of the marginal edge of the plate —3— and holding the latter in place.

The outline of the plate —1— is somewhat triangular in form with its apex at the bottom and its opposite side edges gradually swelling from the apex to the top which latter is provided with double concave portions —1'— meeting at a point —1''— directly over the lower apex, all of which produces an ornamental effect set forth in my design application, Serial Number 9007, filed March 20, 1924, (Case A).

The sight opening —2— is preferably rectangular and is formed in the upper wider portion of the plate —1— midway between the opposite sides thereof, the marginal walls of said opening being rabbeted to form seats —7— against which the corresponding edges of the plaque —3— are adapted to rest when adjusted for use.

In other words, the rabbeted portion of the plate —1— surrounding the opening —2— forms a pocket or marginal recess, in which the plate —3— is seated, the lower, upper and side walls of the pocket serving to hold the plate against vertical or lateral displacement when resting against the seat —7—.

The vertical height of the plate —1— is somewhat greater than the corresponding vertical width of the space between the bumper bars —A— so that the inner faces of the lower and upper edges of the plate may rest flatwise against the outer faces of the bars while the sight opening —2— and plaque —3— will be registered with said space.

The bolt openings as —8—, in the plate —1— at opposite ends of the opening —2— are preferably square to receive corresponding portions of the bolts —5— and holding them against turning when clamping the plates to the bumper bars, the outer ends of the bolts being rounded to form what may be termed rosettes —5'—, at opposite ends of the opening for ornamental purposes in addition to their usual function as bolt heads.

The inner clamping plate —4— is also somewhat triangular in general outline but of somewhat smaller area than that of the outer plate —1— except as to the portions through which the bolts —5— pass, the object being to cause the outer plate to practically conceal the inner plate when the device is adjusted for use upon the bumper bars.

The vertical height of the inner plate —4— is also greater than the distance between the bars —A— so that its upper and lower edges may rest flatwise against the inner faces of said bars in spaced relation to the plate —1—.

This plate —4— is provided with lower and upper parallel ribs or flanges —9— and —10—, the lower face of the lower flange and upper face of the upper flange being arranged a distance apart corresponding approximately to the distance between the adjacent edges of the bumper bars —A— and are beveled inwardly so as to wedge against the inner edges of said bars, and thereby to frictionally hold the plates —1— and —4— against endwise displacement when properly tightened upon the bars.

As previously stated, the lugs —6— are formed upon the inner plate —4— and project outwardly some distance beyond the flanges —9— for engaging the inner faces of the lower, upper and end edges of the display plate —3— and holding said display plate against the seat —7— when the device is adjusted for use and the bolts —5— are firmly tightened.

That is, the tightening of the bolts —5— serves the double purpose of clamping the plates —1— and —4— to the bumper bars —A— and also of clamping the display plate —3— in the pocket of the plate —1— across the sight opening —2—.

The circular openings as —11—, in the plate —4— as shown in Figure 5 are for the purpose of reducing the weight of said plate, which together with the plate —1— may be made of cast metal or any other suitable material while the display plate —3— is preferably made of sheet metal or any other suitable material capable of receiving and displaying any desired name, emblem or other distinguishing character or marks which may add to the utility or ornamental character of the device as a whole.

It will be observed that the lugs —6— in addition to their function of holding the display plate —3— in place also engage the walls of the recess surrounding the opening —2— and thereby serve to hold the sections —1— and —4— against relative lateral or vertical movement.

That is, the ribs —10— hold the plate against vertical movement relatively to the bars —A— and also hold the bars in fixed spaced relation while the lugs —6— on the plate —4— assist the bolts —5— in supporting the plate —1— and holding it against movement relatively to the plate —4—.

What I claim is:

1. The combination with spaced bumper bars for automobiles, of a main plate engaging the bars above and below the space and provided with a sight opening registering with said space, a display plate mounted in the first named plate across the sight opening, and means for clamping the first named plate to the bars and the display plate to the first named plate.

2. A bumper plate of the character described, comprising opposed sections, one of said sections having an opening, the other section having lugs projecting into and engaging the walls of the opening whereby the two sections are held against relative lateral movement, one upon the other, and means for clamping the sections together.

3. The combination with spaced bumper bars, of a bumper plate comprising opposed sections, one of said sections being provided with a recess in its inner face, the other section being provided with lugs projecting into and engaging the walls of the recess to hold both sections against relative lateral movement, one of the sections being provided with ribs projecting into the space between and engaging the adjacent edges of the bars to hold the plate against vertical movement relatively to said bars, and means for clamping the sections against opposite faces of the bars.

4. A bumper plate of the character described comprising opposed sections, one of said sections having a sight opening and a recess extending around the marginal edges of the sight opening, a display plate seated in the recess across the sight opening, the other section being provided with lugs projecting into and engaging the display plate, and means for clamping the sections together to hold the display plate in place.

5. The combination with spaced bumper bars, of a bumper plate comprising opposed sections extending across the space and engaging opposite faces of the bars, one of said sections being provided with a sight opening and a recess extending beyond the opening, the other section being provided with ribs having beveled faces engaging adjacent edges of the bars, and also provided with lugs projecting into and engaging the walls of said recess, and a display plate seated in the recess and held in place by said lugs, and means for tightening and releasing the sections upon and from the bars, and also for tightening and releasing the display plate.

In witness whereof I have hereunto set my hand this 18th day of March, 1924.

WILLIAM F. MARTIN.

Witnesses:
  H. E. CHASE,
  RITA CAMPOLIETO.